3,110,694
COPOLYMERS OF 5,6-BISMETHYLENE-1,2,3,4,7,7-HEXACHLORBICYCLO-(2,2,1)-HEPTENE-(2) AND PROCESS OF MAKING SAME
Herbert Willersinn, Gerhard Dietrich, and Klaus Juergen Fust, Ludwigshafen (Rhine), Herbert Friederich, Worms (Rhine), and Hans Peter Siebel, Ludwigshafen (Rhine)-Oppau, Germany, assignors to Badische Anilin- & Soda-Fabrik Aktiengesellschaft, Ludwigshafen (Rhine), Germany
No Drawing. Filed Oct. 7, 1959, Ser. No. 844,843
Claims priority, application Germany Oct. 7, 1958
6 Claims. (Cl. 260—45.4)

This invention relates to copolymers of a chlor-containing heptene compound with styrene or derivatives of styrene and if desired unsaturated polyesters and to a process of making same.

We have found that (A) 5,6-bismethylene-1,2,3,4,7,7-hexachlorbicyclo-(2,2,1)-heptene-(2) of the formula

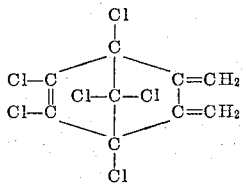

(hereinafter referred to, shortly, as BHH) can be polymerized with (B) styrene or derivatives of styrene and, if desired, with (C) unsaturated polyesters to form polymers having valuable properties.

BHH can be prepared, for example, by reacting 1,4-dichlorbutene-2 with hexachlorcyclopentadiene in the manner of a Diels-Alder reaction to form 5,6-bischlormethyl - 1,2,3,4,7,7-hexachlorbicyclo-(2,2,1)-heptene-(2) and then splitting off hydrogen chloride therefrom with the aid of sodium methylate.

In the practice of our invention we may also use, in addition to styrene, the homologues of styrene, such as alpha-methylstyrene, alpha-halogenstyrene, as for example alpha-chlorstyrene or alpha-bromstyrene, or styrenes bearing one or more alkyl or halogen substituents in the nucleus. Examples of this latter type of styrenes are methyl styrene, dimethylstyrene, chlor-styrene, dichlorstyrene or dibrom-styrene.

Unsaturated polyesters, such as are preferably used in admixture with further polymerizable compounds, as for example styrene, are prepared in known manner, for example by poly-condensation of alpha,beta-unsaturated dicarboxylic acids with polyhydric, preferably dihydric, saturated alcohols. A part of the alpha,beta-unsaturated dicarboxylic acids may be replaced by saturated polycarboxylic acids. Suitable alpha,beta-unsaturated dicarboxylic acids are for example maleic acid, fumaric acid, itaconic acid, citraconic acid, aconitic acid or their substitution products, for example chlormaleic acid or anhydrides of the said acids. The optionally coemployed saturated polycarboxylic acids may be aliphatic, cycloaliphatic or mixed aliphatic-aromatic dibasic or higher polyhydric carboxylic acids, possibly substituted, as for example succinic acid, glutaric acid, adipic acid, pimelic acid, sebacic acid, suberic acid, alpha-methylglutaric acid, oxadibutyric acid, sulfone-dibutyric acid, phthalic acid, endomethylene-tetrahydrophthalic acid, hexachlorendomethylene - tetrahydrophthalic acid, tetrachlorphthalic acid, tetrabromphthalic acid, phenylene-dibutyric acid or anhydrides of these acids. Instead of the free acids there may also be used their esters with low molecular weight alcohols for the production of the unsaturated polyesters. By the co-employment of monobasic carboxylic acids or monohydric alcohols in the polycondensation, the degree of condensation of the unsaturated polyesters and consequently the viscosity of their solutions in the monomeric compounds can be adjusted.

The relative proportions of the components in the polymerizable mixture may vary within the following limits:
(A) between about 5 and 75 parts by weight of BHH;
(B) between about 10 and 80 parts by weight of styrene or styrene derivatives, and
(C) between 0 and 70 parts by weight of an unsaturated polyester,
the total of the three components amounting to 100 parts in each case.

The copolymerization of BHH with the above-mentioned other polymerizable compounds may be carried out by all known polymerization processes, such as block (or bulk) polymerization, solution polymerization, emulsion polymerization, suspension polymerization, precipitation polymerization and the like.

The copolymerization can be initiated in many cases by thermal activation alone. It is however more advantageous to accelerate the reaction by the action of radiation, for example light, especially ultraviolet light, or by the addition of polymerization catalysts which are capable of decomposing into radicals which initiate the polymerization.

Suitable polymerization catalysts of the said kind are for example benzoyl peroxide, lauroyl peroxide, perlauric acid, cumene hydroperoxide, tertiary butyl hydroperoxide, ditertiary butyl peroxide, methyl ethyl ketone peroxide, cyclohexanone peroxide and the like, and also unstable azo compounds, as for example azodi-isobutyrodinitrile.

For polymerization in emulsion it is advantageous to use water-soluble per compounds, as for example hydrogen peroxide or potassium persulfate.

The polymerization can be accelerated in the usual way by the use of redox systems and metal redox systems in which the above-specified per compounds are used in combination with reducing agents, as for example benzoin, sodium formaldehyde sulfoxylate, sugar and the like and/or possibly of metal compounds.

The copolymers of BHH have valuable properties. They may be used both in the plastics field and as lacquer raw materials, depending on the degree of polymerization and their constitution. Polymerizable mixtures which contain unsaturated polyesters with alpha,beta-unsaturated dicarboxylic acid radicals can serve as casting resins for the production of shaped articles, laminates reinforced with glass fibers, corrugated glasses, building elements and the like. By reason of the high chlorine content, the copolymers are inflammable only with difficulty. The flame resistance can be further increased by incorporating substances containing phosphorus or for example antimony trioxide.

The following examples will further illustrate this invention but the invention is not restricted to these examples. The parts specified in the examples are parts by weight.

Example 1

2 parts of a 40% paste of cyclohexanoneperoxide with dibutyl phthalate and 0.4 part of a 10% solution of cobalt naphthenate in styrene are added to 56 parts of an unsaturated polyester derived from maleic acid, tetrachlorphthalic acid and propylene glycol in the mol ratio of 1:1:2.2 and having the acid number 35, 24 parts of styrene, 20 parts of BHH and 0.01 part of hydroquinone (for stabilization). The mixture is poured into molds and left to stand at room temperature until the exothermic hardening reaction has ceased. The product is then annealed for 12 hours at 100° C. A hard, solid and clear shaped article is obtained. The softening point of the polymer is 94° C. It is insoluble in the usual solvents and infusible.

By working up the above-mentioned polymerizable mixture containing added catalysts and activator, with glass fiber fabric in the usual way, a self-extinguishing laminate is obtained which is distinguished by a very good flame resistance. By replacing the BHH in the polymerizable mixture by styrene, a laminate is obtained which is not self-extinguishing.

*Example 2*

A mixture is prepared from 40 parts of an unsaturated polyester (acid number 50) composed of maleic acid, tetrachlorphthalic acid and propylene glycol-1,2 in a molar ratio of 1:1:2.2; 30 parts of BHH and 30 parts of styrene and stabilized against premature polymerization by the addition of 0.01% of para-tertiary-butylpyrocatechol. The mixture has a viscosity of 19.3 DIN seconds (measured in a DIN beaker No. 4 at 20° C.). It is further given an addition of 2% of a 40% paste of cyclohexanoneperoxide in dibutylphthalate and 0.4% of a 10% solution of cobalt naphthenate in styrene and then poured into molds.

The mixture begins to gel after about 3 hours and hardens through in an exothermic reaction giving hard, clear moldings which are self-extinguishing, i.e. do not burn when removed from the live flame. After having been annealed at 100° C. for 12 hours, the polymers have a softening point of 114° C. and an impact strength of 14.6 cm.kg./cm.$^2$.

*Example 3*

A highly viscous mixture prepared from 500 parts of an unsaturated polyester (acid number 51.7) from maleic acid, hexachlorendomethylene tetrahydrophthalic acid and propylene glycol-1,2 in a molar ratio of 2:1:3.2; 375 parts of BHH and 125 parts of styrene is stabilized against premature polymerization by the addition of 0.01% of hydroquinone and then polymerized as described in Example 2.

The self-extinguishing moldings obtained are tough, hard, clear and transparent. Their softening point is at 120° C.

*Example 4*

A highly viscous polymerizable mixture of 70 parts of an unsaturated polyester (acid number 23.4) from maleic acid, tetrachlorphthalic acid and propylene glycol-1,2 in a molar ratio of 1:1:2.2; 20 parts of styrene and 10 parts of BHH is stabilized with 0.01% of hydroquinone to prevent premature polymerization, and, after adding 0.5% of a 50% paste of benzoyl peroxide in dibutylphthalate, poured into molds and polymerized therein at 80° C. for 12 hours after removing the air bubbles. The moldings obtained are hard, clear and self-extinguishing. Their softening point is at 120° C.

*Example 5*

A highly viscous polymerizable mixture of 60 parts of an unsaturated polyester (acid number 45) from maleic acid, hexachlorendomethylene tetrahydrophthalic acid and propylene glycol-1,2 in a molar ratio of 1:1:2.2; 20 parts of BHH and 20 parts of styrene is stabilized with 0.01% of hydroquinone to prevent premature polymerization and, after adding 1% of methylethylketone peroxide and 0.4% of a 10% solution of cobalt octoate in styrene, poured into molds. The mixture comes to gel after about 45 minutes and hardens in an exothermic reaction. The self-extinguishing moldings obtained are subsequently annealed at 100° C. for 12 hours.

The polymers have a soften point of 118° C. and an impact strength of 9.6 cm.kg./cm.$^2$.

*Example 6*

A polymerizable mixture of 40 parts of an unsaturated polyester (acid number 51.7) of maleic acid, hexachlorendomethylene tetrahydrophthalic acid and propylene glycol-1,2 in a molar ratio of 2:1:3.3; 30 parts of BHH and 30 parts of dichlorstyrene (mixture of isomers) is stabilized with 0.01% of hydroquinone to prevent premature polymerization and, after adding 2% of a 40% paste of cyclohexanone peroxide in dibutylphthalate and 0.4% of a 10% solution of cobalt naphthenate in styrene, poured into molds. The mixture begins to gel after about one hour and hardens through in an exothermic reaction. The hard moldings are no longer inflammable due to their extremely high halogen content.

*Example 7*

A polymerizable mixture of 50 parts of an unsaturated polyester (acid number 51.7) from maleic acid, hexachlorendomethylene tetrahydrophthalic acid and propylene glycol-1,2 in a molar ratio of 2:1:3.3; 20 parts of BHH and 30 parts of methyl styrene is stabilized with 0.01% of hydroquinone to prevent premature polymerization and polymerized as described in Example 6. The moldings obtained are hard and self-extinguishing.

*Example 8*

A solution of 20 parts of BHH in 80 parts of styrene has 0.1% of benzoyl peroxide added thereto and is then polymerized for 15 hours at 80° C., then for 8 hours at 100° C. and finally for 15 hours at 120° C.

A hard tough polymer is obtained which exhibits a slight opalescent cloudiness; it has a $k$-value according to Fikentscher of 76. It is soluble in benzene, toluene and chloroform. The softening point is 104° C.

*Example 9*

A solution of 50 parts of BHH in 50 parts of styrene is polymerized as described in Example 8. A product is obtained with similar properties. The $k$-value according to Fikentscher is 64 and the softening point 142° C.

*Example 10*

A mixture of 75 parts of BHH and 25 parts of styrene is incorporated with 0.1% of benzyl peroxide and polymerized at 80° C. for 15 hours, at 100° C. for 8 hours and at 120° C. again for 15 hours. The hard, tough, clear, yellow-tinged polymer obtained is soluble in benzene, toluene and chloroform. It softens at 144° C. and has a $k$-value according to Fikentscher of 46.

*Example 11*

A mixture of 350 parts of BHH, 250 parts of styrene, 2,300 parts of water, 3.5 parts of azodiisobutyric acid dinitrile and 3.5 parts of polyvinylpyrrolidone (with $k$-value 60) is polymerized at 85° C. for 48 hours in a glass flask fitted with a stirrer and a reflux cooling system, the stirring speed being 360 revolutions per minute. The bead polymer obtained is nutched, thoroughly washed with water and dried. The product obtained is a faintly yellow plastic having a $k$-value according to Fikentscher of 37 and a softening point of 120° C.

*Example 12*

A mixture of 120 parts of BHH, 40 parts of styrene, 600 parts of water, 0.75 part of azodiisobutyric acid dinitrile and 0.75 part of gelatine is polymerized at 85° C. for 10 hours in a glass flask fitted with a stirrer and a reflux cooling system. The bead polymer obtained is washed on a nutch and dried yielding a faintly yellow plastic with a $k$-value according to Fikentscher of 44 and a softening point of 135° C.

*Example 13*

A mixture of 25 parts of BHH and 75 parts of dichlorstyrene (mixture of isomers) is polymerized as described in Example 10. The product obtained is a hard, somewhat brittle plastic which is soluble in benzene, toluene and chloroform. It has a $k$-value according to Fikentscher of 27.5. It can be used as a basic material for the production of non-combustible lacquers.

*Example 14*

A mixture of 200 parts of water, 50 parts of BHH, 50 parts of styrene, 2 parts of sodium alkylsulfonate ($C_{16}$–$C_{18}$) and 0.5 part of potassium persulfate is polymerized at 70° C. while stirring. By evaporating the dispersion a polymer having a *k*-value of 48 and a softening point of 106° C. is obtained.

What we claim is:

1. A process for the production of copolymers which comprises subjecting to a free radical initiated polymerization a mixture of (A) 5 to 75 parts by weight of 5,6-bismethylene - 1,2,3,4,7,7-hexachlorbicyclo-(2,2,1)-heptene-(2) of the formula

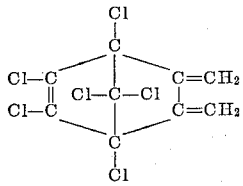

(B) 10 to 80 parts by weight of a compound selected from the group consisting of styrene, alkyl styrene and halo-ring substituted styrene and (C) up to 70 parts by weight of an unsaturated polyester of an alpha-olefinic dicarboxylic acid and a polyhydric alcohol, the total of (A), (B) and (C) amounting to 100 parts by weight in each case.

2. A copolymer of a monomer mixture comprising (A) 5 to 75 parts by weight of 5,6-bismethylene-1,2,3,4,7,7-hexachlorbicyclo-(2,2,1)-heptene-(2), (B) 10 to 80 parts by weight of a compound selected from the group consisting of styrene, alkyl styrene and halo-ring substituted styrene and (C) up to 70 parts by weight of an unsaturated polyester of an alpha-olefinic dicarboxylic acid and a polyhydric alcohol, the total of (A), (B) and (C) amounting to 100 parts by weight in each case.

3. A copolymer of a ternary monomer mixture comprising (A) 5 to 75 parts by weight of 5,6-bismethylene-1,2,3,4,7,7-hexachlorbicyclo-(2,2,1)-heptene-(2), (B) 10 to 80 parts by weight of styrene and (C) up to 70 parts by weight of an unsaturated polyester of maleic acid and propylene glycol-1,2, the total of (A), (B) and (C) amounting to 100 parts by weight in each case.

4. A copolymer of a ternary monomer mixture comprising (A) 5 to 75 parts by weight of 5,6-bismethylene-1,2,3,4,7,7-hexachlorbicyclo-(2,2,1)-heptene-(2), (B) 10 to 80 parts by weight of styrene and (C) up to 70 parts by weight of an unsaturated polyester derived from a mixture of maleic acid with hexachlorendomethylene tetrahydrophthalic acid with propylene glycol-1,2, the total of (A), (B) and (C) amounting to 100 parts by weight in each case.

5. A copolymer of a ternary monomer mixture comprising (A) 5 to 75 parts by weight of 5,6-bismethylene-1,2,3,4,7,7-hexachlorbicyclo-(2,2,1)-heptene-(2), (B) 10 to 80 parts by weight of styrene and (C) up to 70 parts by weight of an unsaturated polyester of a mixture derived from maleic acid, tetrachlorphthalic acid with propylene glycol-1,2, the total of (A), (B) and (C) amounting to 100 parts by weight in each case.

6. A copolymer of a ternary monomer mixture comprising (A) 5 to 75 parts by weight of 5,6-bismethylene-1,2,3,4,7,7-hexachlorbicyclo-(2,2,1)-heptene-(2), (B) 10 to 80 parts by weight of dichlor-styrene and (C) up to 70 parts by weight of an unsaturated polyester derived from a mixture of maleic acid with hexachlorendomethylene tetrahydrophthalic acid with propylene glycol-1,2, the total of (A), (B) and (C) amounting to 100 parts by weight in each case.

References Cited in the file of this patent

UNITED STATES PATENTS

| | | |
|---|---|---|
| 2,779,701 | Robitschek et al. | Jan. 29, 1957 |
| 2,822,340 | McGovern et al. | Feb. 4, 1958 |
| 2,912,356 | Schmerling | Nov. 10, 1959 |
| 2,951,099 | Hoch | Aug. 30, 1960 |

FOREIGN PATENTS

| | | |
|---|---|---|
| 714,830 | Great Britain | Sept. 1, 1954 |
| 768,957 | Great Britain | Feb. 27, 1957 |